No. 756,827. PATENTED APR. 12, 1904.
F. P. BURKHARDT.
GRINDER FOR HARROW DISKS.
APPLICATION FILED SEPT. 8, 1902.
NO MODEL.
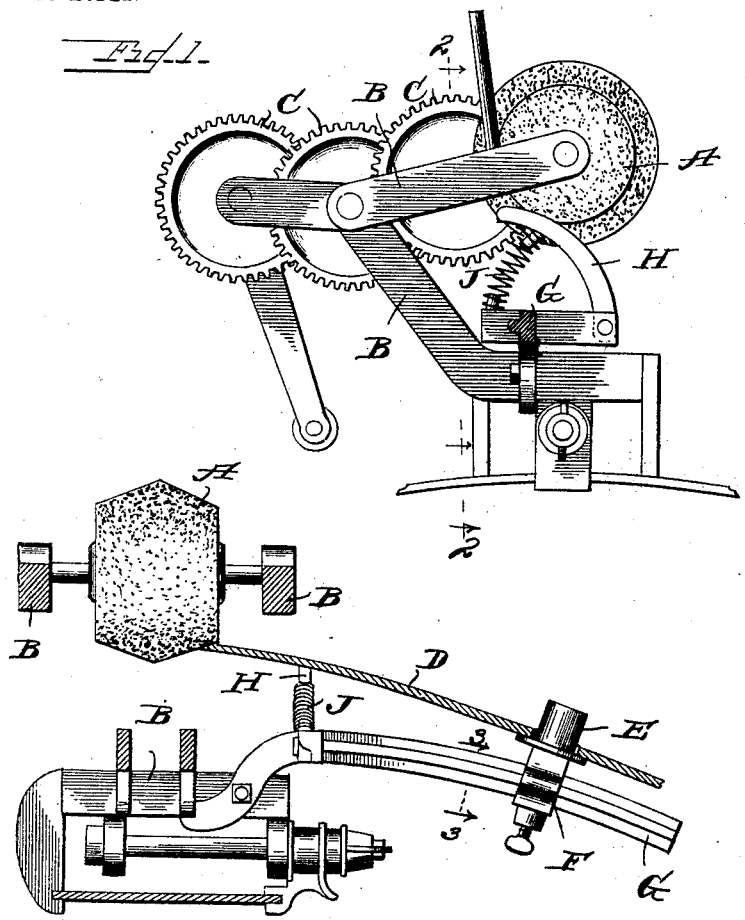
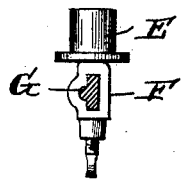
Witnesses
Chas H. Seem
D. S. Mackay
Inventor
Franklin P. Burkhardt
By Brown + Darby
Attys.

No. 756,827. Patented April 12, 1904.

UNITED STATES PATENT OFFICE.

FRANKLIN P. BURKHARDT, OF CHICAGO, ILLINOIS, ASSIGNOR TO THE WARDER, BUSHNELL & GLESSNER COMPANY, OF CHICAGO, ILLINOIS, A CORPORATION OF OHIO.

GRINDER FOR HARROW-DISKS.

SPECIFICATION forming part of Letters Patent No. 756,827, dated April 12, 1904.

Application filed September 8, 1902. Serial No. 122,484. (No model.)

*To all whom it may concern:*

Be it known that I, FRANKLIN P. BURKHARDT, a citizen of the United States, residing at Chicago, in the county of Cook and State of Illinois, have invented a new and useful Improvement in Grinders for Harrow-Disks, of which the following is a specification.

This invention relates to grinders for harrow-disks.

The object of the invention is to simplify and improve the construction of grinders for the disks employed in disk harrows and to render the same efficient in operation.

A further object of the invention is to provide a yielding pressure for the disk operating to yieldingly press the same toward the grinder, whereby by relieving the pressure on the disk during the grinding operation the speed of rotation of the disk while being ground may be regulated.

The invention consists substantially in the construction, combination, location, and arrangement of parts, all as will be more fully hereinafter set forth, shown in the accompanying drawings, and finally pointed out in the appended claims.

Referring to the accompanying drawings and to the various views and reference-signs appearing thereon, Figure 1 is a view in side elevation of a grinder for harrow-disks embodying the principles of my invention. Fig. 2 is a section on the line 2 2, Fig. 1. Fig. 3 is a detail view in section on the line 3 3 of Fig. 2 looking in the direction of the arrows.

The same part is designated by the same reference-sign wherever it occurs throughout the several views.

Difficulty has been experienced in sharpening the circular disks employed in disk harrows. Machines have been devised for grinding these disks wherein the disks have been mounted centrally upon a stud and the grinding-tool pressed down upon the edge of the disk. The result of this construction is that when rotations are imparted to the grinding-tool to effect the grinding operation such rotations are imparted to the disk to be ground, which disk attains under the action of the grinder a high speed of rotation, and which is objectionable.

It is among the special purposes of my invention to provide a construction and arrangement wherein the disk is yieldingly pressed toward or in contact with the grinding-tool, so that by opposing, by the hand of the operator or otherwise, the yielding tension under which the disk is pressed toward the grinding-tool the speed of rotation of the disk under the influence of the grinding-tool may be regulated, varied, and controlled. This result I accomplish in a most simple and efficient manner in the construction shown and now to be described.

Reference-sign A designates the grinding-tool, which may be of any suitable shape or form and supported in any convenient manner—as, for instance, in a framework B—and driven or rotated through any suitable or convenient arrangement of gearing (indicated at C) or otherwise, as may be found suitable or desirable.

D designates the harrow-disks suitably mounted for free axial rotation—as, for instance, in the particular form shown (but to which the invention is not limited)—by mounting the same centrally upon a stud E, carried by a clip or block F, adjustably mounted upon an arm or bar G, suitably secured to or forming part of the framework B. Any suitable arrangement of tension device arranged to impose a yielding tension upon the harrow-disk D tending to press the same yieldingly toward the grinder may be employed within the spirit and scope of my invention. I have shown a simple construction and arrangement which I have found effective and satisfactory, but to which I do not desire to be limited, wherein an arm H is pivotally mounted upon a convenient part of the framework or on arm G and in position to engage the harrow-disk, so as to press the same yieldingly toward or in contact with the grinding-tool A. A spring J may be arranged to exert its tension upon pivoted arm H, so as to secure the desired degree of pressure of said arm against the harrow-disk.

From the foregoing description it will be readily seen that the operator by placing one hand upon the face or side of the harrow-disk opposite to that which is engaged by the lever H may vary, regulate, and control the pressure of the harrow-disk toward the grinding-tool. With the other hand the operator imparts the rotations to the grinding-tool, and consequently in this manner the speed of axial rotation of the harrow-disk under the engagement therewith of the grinder may be regulated and controlled, so as to secure the desired grinding effect. It will be readily seen that if the same peripheral speed of rotation of the harrow-disk is attained as that of the grinding-tool the effect is substantially the same as two friction-gears upon each other—that is, there would be no efficient grinding effect.

By the arrangement above described and forming the subject of my invention by varying the yielding pressure tending to hold the disk pressed toward the grinding-tool I am enabled to control the relative peripheral speeds of the disk and grinder, and hence secure the desired efficient grinding action of the tool.

Any suitable or convenient means may be employed for clamping the framework upon the work-bench or other convenient place, and as the same forms no part of my present invention specific description of such construction is unnecessary herein.

Having now set forth the object and nature of my invention and a construction embodying the principles thereof, what I claim as new and useful and of my own invention, and desire to secure by Letters Patent, is—

1. In an apparatus for grinding harrow-disks, the combination with a frame, a grinding-tool mounted therein and means for operating said tool, of a support upon which the disk to be ground is loosely mounted for free rotation, and yielding means also mounted upon said frame arranged to bear against one side or face of the disk to be ground to yieldingly press the opposite side or face of said disk against the grinder-tool, as and for the purpose set forth.

2. In an apparatus for grinding harrow-disks, the combination with a grinder-frame having an arm, a grinding-tool journaled in said frame, and means for rotating said tool, of a stud adjustably mounted upon said arm and forming a support upon which the disk to be ground is supported for free rotation, and an arm yieldingly mounted upon said frame and arranged to bear against the disk to be ground, whereby said disk is yieldingly pressed into engagement with the grinder-tool, as and for the purpose set forth.

3. In an apparatus for grinding harrow-disks, a grinding-tool, and means for operating the same, in combination with a fixed stud upon which the disk to be ground is loosely mounted to revolve, and means arranged to bear against the disk for yieldingly pressing the disk toward the grinding-tool, as and for the purpose set forth.

4. In an apparatus for grinding harrow-disks, a grinding-tool, and means for operating the same, in combination with means for rotatively supporting the disk to be ground, and means for yieldingly engaging the side or face of the disk to yieldingly press the opposite side or face of said disk toward the grinding-tool, as and for the purpose set forth.

5. In an apparatus of the class described, a frame, a stud mounted thereon and upon which the disk to be ground is mounted to rotate, an arm mounted on said frame, and means for pressing said arm yieldingly against the face or side of the disk, and a grinding-tool against which the opposite side or face of the disk bears, and means for rotating said grinding-tool, all combined and arranged as and for the purpose set forth.

In witness whereof I have hereunto set my hand, this 4th day of September, 1902, in the presence of the subscribing witnesses.

FRANKLIN P. BURKHARDT.

Witnesses:
L. C. PETERSON,
A. L. SPRINKLE.